United States Patent [19]

Allen

[11] Patent Number: 5,222,697
[45] Date of Patent: Jun. 29, 1993

[54] PIN PULLER FOR PARACHUTE AUTOMATIC ACTIVATION SYSTEM

[75] Inventor: Roger F. Allen, Mt. Laurel, N.J.
[73] Assignee: SSE Incorporated, Pennsauken, N.J.
[21] Appl. No.: 832,921
[22] Filed: Feb. 10, 1992
[51] Int. Cl.⁵ .......................................... B64D 17/54
[52] U.S. Cl. ................................................. 244/149
[58] Field of Search .............................. 244/147–152; 292/144, DIG. 21; 89/1.1

[56] References Cited

U.S. PATENT DOCUMENTS

| | | | |
|---|---|---|---|
| 2,505,869 | 5/1950 | Quilter | 244/150 |
| 2,555,341 | 6/1951 | Johnson | 244/150 |
| 3,112,091 | 11/1963 | Snyder | 244/150 |
| 3,281,098 | 10/1966 | Stencil et al. | 244/149 |
| 3,462,101 | 8/1969 | Chevrier | 244/148 |

Primary Examiner—Galen Barefoot
Attorney, Agent, or Firm—Norman E. Lehrer

[57] ABSTRACT

A pin puller for use in an automatic activation system for initiating the deployment of a parachute includes a small pyrotechnic actuator comprised essentially of a piston and cylinder. The cylinder includes a bracket through which the ripcord pin extends and which passes through the parachute pack closing loop. A thrust plate is carried by the forward end of the piston and is adapted to engage the loop. When the actuator is fired, the piston is prevented from moving forward by its engagement with the loop whereby the cylinder moves rearwardly withdrawing the pin from the loop. The entire pin puller assembly is carried on the exterior of the pack and is supported essentially by the interaction of the pin with the loop.

9 Claims, 2 Drawing Sheets

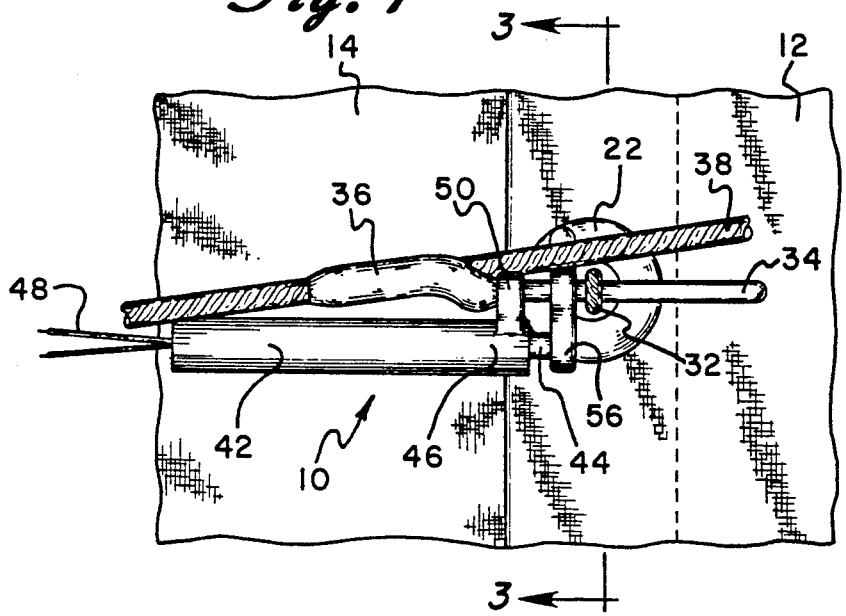
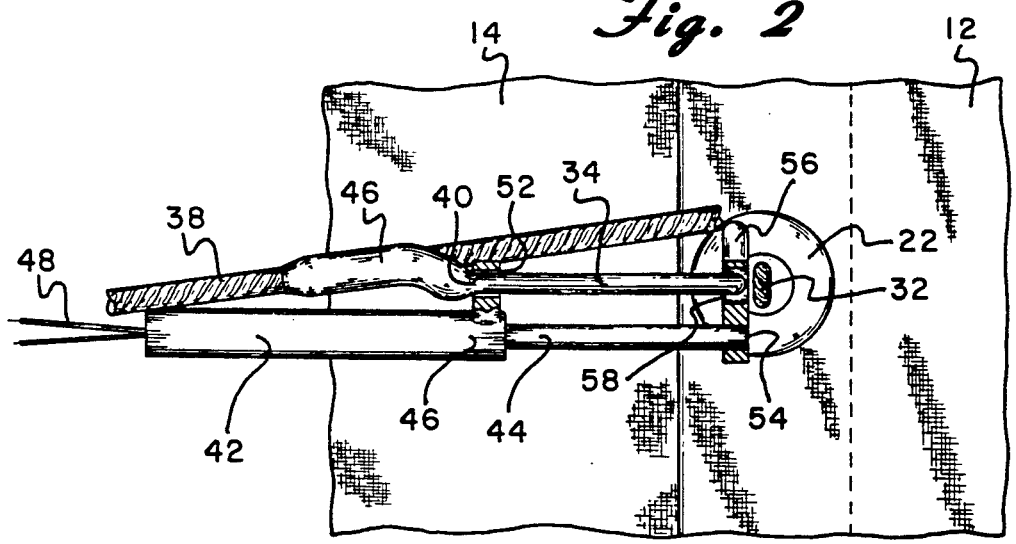
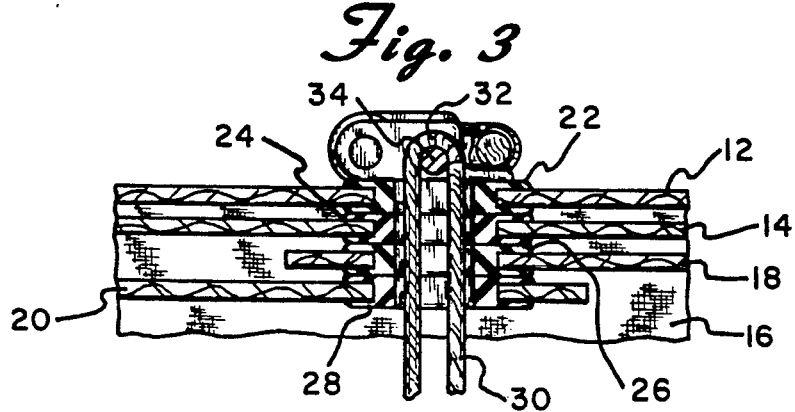

PIN PULLER FOR PARACHUTE AUTOMATIC ACTIVATION SYSTEM

BACKGROUND OF THE INVENTION

The present invention is directed toward a pin puller for a parachute automatic activation system and more particularly toward such a pin puller which is extremely small and easily attached to the pin. The pin puller is carried totally externally of the parachute pack and will not interfere with the normal manual operation of the ripcord assembly.

Automatic activation systems for parachutes have been known and used for some time. As is well known in the art, these systems include electronic devices which measure both altitude and rate of descent and initiate a signal when certain preset conditions are exceeded thereby indicating that the skydiver or other user has failed to manually open his parachute. This signal is then used to activate a pin puller which may be an electrical, mechanical or pyrotechnic device which withdraws the ripcord pin that is normally maintaining the parachute pack closed.

These automatic activation systems are most frequently used to deploy a reserve parachute or canopy although it is also possible to utilize the same type of system with the main parachute. Examples of these known automatic activation devices are the Mk2000 "Sentinel" automatic activation system and the Mars FF-3 mechanical automatic release system, both of which are sold by SSE Incorporated, of Pennsauken, N.J.

In substantially all known prior automatic activation systems, the pin puller actuator is relatively large and bulky and must, therefore, be remotely located from the pin. Normally the actuator must be mounted within the parachute pack and a hole must be cut through the side of the pack to allow the flexible jacketed cable from the actuator to extend around the pack towards the ripcord pins. A bracket or the like must then be used to secure the end of the cable jacket to the outside of the pack so that the actuator cable can be connected to the pin. These known arrangements not only can add substantial weight to the pack but can cause damage thereto.

As is known in the art, many parachute packs include two or more spaced apart pins for maintaining the same closed. It is common practice, however, to use a single actuating device to pull or withdraw all of the pins. This is accomplished by having all of the pins interconnected by a single cord. Because of the geometry of the pack, the arrangement of the pins thereon and the angle at which the bracket from the actuating cable jacket is secured to the pack, it is possible that the actuator may successfully pull one or more of the pins but may not pull all of them. This would, of course, lead to catastrophic consequences.

A proposed solution to the use of remotely located actuators and their attendant problems is suggested in U.S. Pat. Nos. 4,858,856 and 5,024,400. Each of these patents describes a system including a device mounted within the parachute pack for severing or otherwise releasing the closing or reserve locking loop from within the pack. Although the ripcord pins would remain in place upon activation, the theory of these patented systems is that the closing flaps of the parachute pack will be forced open and the reserve locking loop will eventually thread its way through the openings in the flaps closing the pack. Obviously, if the loop does not quickly thread its way through the openings, the canopy may not open at all or may open too late to be of any use.

SUMMARY OF THE INVENTION

The present invention is designed to overcome all of the deficiencies of the prior art described above. The invention is directed toward a pin puller which is adapted to be used in an automatic activation system for initiating the deployment of a parachute and includes a small pyrotechnic actuator comprised essentially of a piston and cylinder. The cylinder includes a bracket which engages the retaining pin allowing the same to extend from the forward end thereof and pass through the parachute pack closing loop. A thrust plate is carried by the forward end of the piston and is adapted to engage the loop. When the actuator is fired, the piston is prevented from moving forward by its engagement with the loop whereby the cylinder moves rearwardly withdrawing the pin from the loop. The entire pin puller assembly is carried on the exterior of the pack and is supported essentially by the interaction of the pin with the loop.

BRIEF DESCRIPTION OF THE DRAWINGS

For the purpose of illustrating the invention, there are shown in the accompanying drawings forms which are presently preferred; it being understood that the invention is not intended to be limited to the precise arrangements and instrumentalities shown.

FIG. 1 is a top plan view of an actuator system of the present invention showing the same in use closing the flap of a parachute pack;

FIG. 2 is a view similar to FIG. 1 but showing the pin withdrawn by activation of the device;

FIG. 3 is a cross-sectional view taken through the line 3—3 of FIG. 1;

DETAILED DESCRIPTION OF THE PREFERRED EMBODIMENTS

Figure 4:
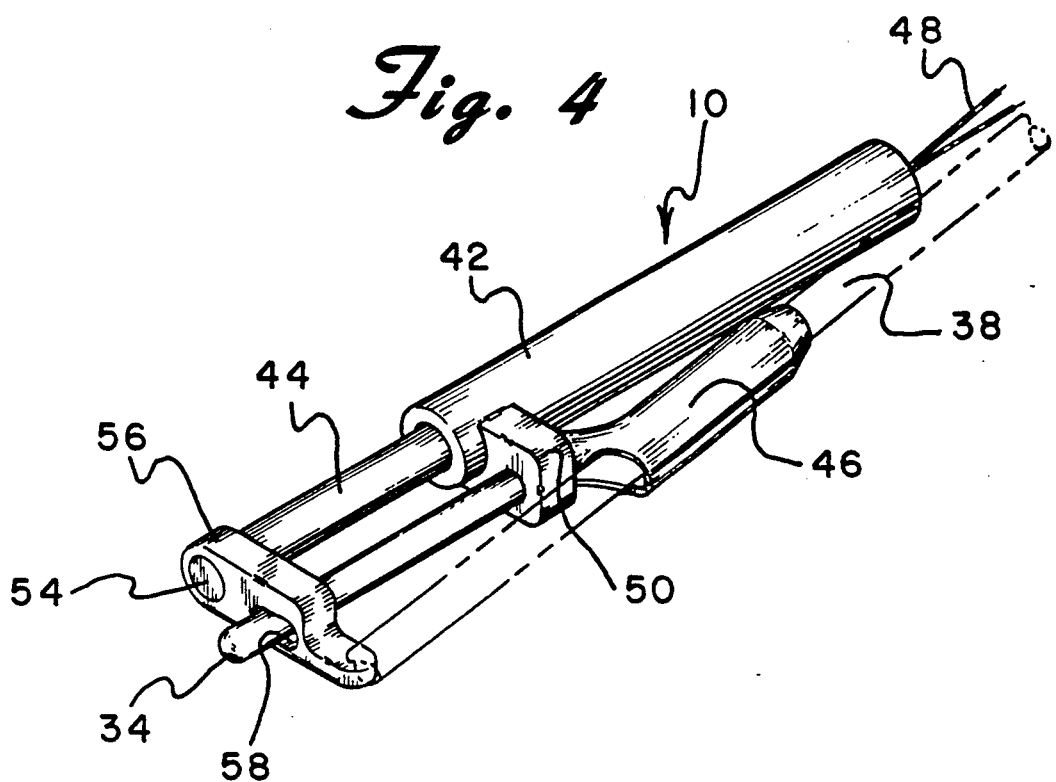
FIG. 4 is a front perspective view of the actuator and pin assembly of the invention.

Referring now to the drawings in detail wherein like reference numerals have been used throughout the various figures to designate like elements, there is shown in FIGS. 1, 2 and 4 an actuator and pin puller assembly constructed in accordance with the principles of the present invention and designated generally as 10.

In FIGS. 1 and 2, the assembly 10 is shown overlying the outside or exterior of covers 12 and 14 of a parachute pack designated generally as 16. As shown most clearly in FIG. 3, the parachute pack 16 may have as many as four flaps or covers which overlie each other in a known manner to close the pack. These flaps are shown in FIG. 3 at 12, 14, 18 and 20. Each flap includes a grommeted opening therein such as shown at 22, 24, 26 and 28, respectively. As is well known in the art, these grommeted openings are arranged in the various flaps or covers so as to be in substantial alignment with each other when the pack 16 is closed.

As is also well known in the art, a parachute, not shown, would be properly folded and placed within the pack 16 so as to be below the lowermost flap 20. A spring loaded pilot parachute, also not shown, is also located within the pack 16 and pushes upwardly against the undersurface of the flap 20 and attempts to force the flaps open. As is further known in the art, the flaps or covers are maintained in their closed position against the force of the pilot parachute by the use of an elongated reserve locking loop 30 having one end, not shown, secured to the interior of the pack 16 and the other end 32 extending through all of the grommeted openings to the exterior of the uppermost cover or flap 12 where pin 34 extends therethrough to prevent the covers from opening.

Pin 34 is part of the pre-existing ripcord system normally used with a parachute pack. As is well known in the art, the rear end 36 of the pin 34 includes a cable clamp which is used to secure the pin to cable or cord 38 of the manual ripcord assembly. Cord 38 passes through the clamp 36 and is secured thereto. It can either terminate at the clamp 36 or, as shown in the figures, can extend entirely therethrough to a second or third pin if the parachute pack includes one or more additional pins. The pin 34 per se is substantially cylindrically shaped and of a substantially constant diameter. However, the pin is enlarged in the transitional area 40 (FIG. 2) where it joins the clamp portion 36.

The actuator and pin puller assembly 10 which is to be used with the pre-existing ripcord assembly pin just described is comprised essentially of a housing or cylinder 42 having a piston 44 extending from the forward end 46 thereof. The combination of the cylinder 42 and piston 44 is, per se, a known pyrotechnic actuator such as is available from Leafield Engineering Ltd., of Leafield, Corsham, Wiltshire, England. The pyrotechnic actuator includes a charge therein which, when ignited by an electrical signal through wires 48, causes the piston 44 to thrust forwardly so as to extend out of the cylinder 42 as shown in FIG. 2. Wires 48 are, of course, connected to a known electronic altitude and rate of descent sensor as discussed above. Although the pyrotechnic actuator comprised of cylinder 42 and piston 44 is relatively small, having a length of only approximately 40 mm, it is capable of exerting a thrust force in excess of 50 lbs.

Integrally secured to the forward end 46 of the cylinder 42 is a bracket 50 which extends away from the cylinder 42 in an axial direction. An aperture 52 is formed in the bracket 50. This aperture is slightly larger than the diameter of the pin 34 so that the pin can freely pass therethrough. However, the aperture 52 is smaller than the transition portion 40 of the pin so as to act as a stop means. As shown in the drawings, pin 34 passes through the aperture 52 so as to extend forwardly of the cylinder 42. The pin 34 is parallel to but axially offset from the piston 38.

The forwardmost free end 54 of the piston 44 includes a thrust plate 56 which is secured thereto so as to move with the piston 44. Thrust plate 56 extends axially from the piston 44 in the direction of the pin 34 and includes an aperture 58 therein which is adapted to allow the pin 34 to freely pass therethrough. As shown in FIG. 4, the aperture 58 is slightly elongated to ensure that the pin 34 can freely pass therethrough in the event that a torquing force causes the pin 34 and piston 44 to become misaligned during use.

The actuator and pin puller assembly 10 of the present invention is utilized in the following manner. In its normal ready and preactuated state, the device 10 is as shown in FIG. 1 with the piston 44 substantially within the cylinder or housing 42 and the pin 34 passing substantially entirely through the aperture 58 in the thrust plate 56. The forward end of the pin 34 then passes through the loop 32 to maintain the parachute pack cover in its closed condition. It should be noted that no independent or additional means are needed to maintain the assembly 10 in place on the parachute pack. The interfitting of the pin 34 passing through the loop 32 holds the entire assembly in place. That is, the loop 32 exerts a downward or inward force on the pin 34 which forces the assembly 10 against the outside cover 12 of the parachute pack 16.

When the parachute automatic activation device indicates that the parachute should be deployed, an electrical signal appears at wires 48 thereby firing the pyrotechnic device. This causes the piston 44 to attempt to thrust forwardly. However, since the thrust plate 56 engages the loop 32, the piston cannot move forwardly. As a result, the cylinder or housing 42 moves rearwardly pulling with it the pin 34 which is fully withdrawn from the loop 32. The parachute pack is then forced open by the pilot parachute therein. As should be readily apparent to those skilled in the art, if there are second or third pins, each will be provided with a separate pyrotechnic device and all will be actuated simultaneously.

Figure 5:
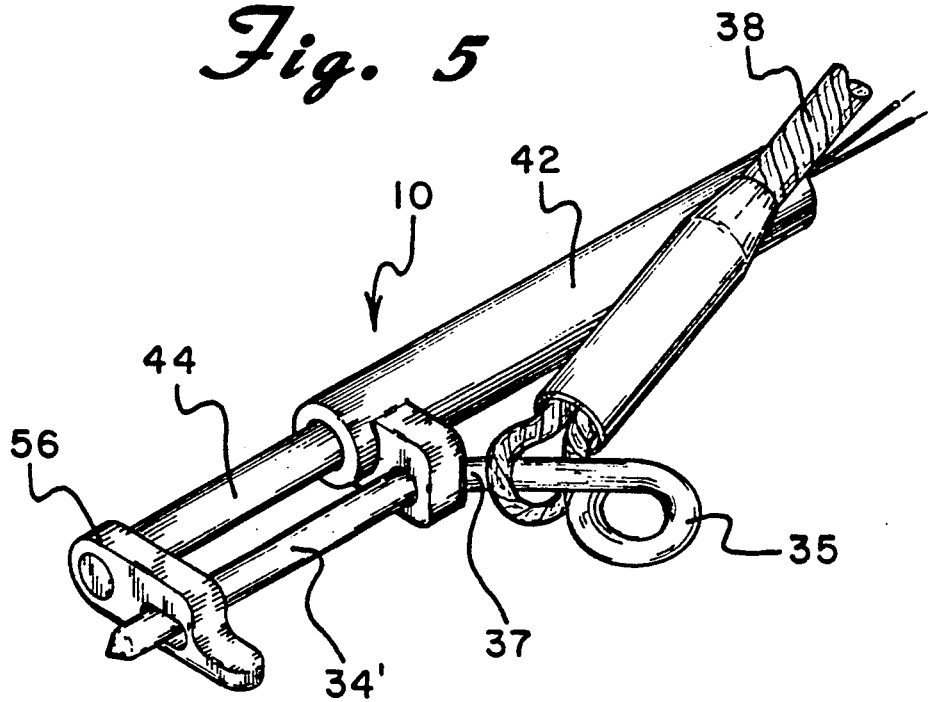
FIG. 5 is a view similar to FIG. 4 showing the use of the invention in a slightly modified form.

The actuator and pin puller assembly 10 shown in FIG. 5 is identical to that shown in the other figures. However, FIG. 5 shows the use of the assembly with a curved pin 34' having a loop 35 formed at the end thereof for connecting the same to a Stevens lanyard. As is known in the art, a Stevens lanyard is used to automatically pull the ripcord pins of a reserve parachute pack in the event that the main parachute is jettisoned. Obviously, it is the bend 37 in the pin 34' that engages the bracket 50 to prevent the pin from passing entirely through the aperture 52.

Although the preferred embodiment of the invention as described above shows the thrust plate mounted at the end of the piston and the pin being carried by the cylinder or housing of the pyrotechnic device, it should be readily apparent to those skilled in the art that the reverse is also possible. That is, the thrust plate could be formed at the forward end of the cylinder and the piston could carry the pin. If this type of arrangement were desired, then a retractable pyrotechnic actuator such as Model 1MT18 or 1MT165 available from ICI Aerospace would have to be employed. These retractable actuators normally have the piston extended and retract the same when the actuator is fired.

The present invention may be embodied in other specific forms without departing from the spirit or essential attributes thereof and accordingly reference should be made to the appended claims rather than to the foregoing specification as indicating the scope of the invention.

I claim:

1. In an automatic activation system for initiating the deployment of a parachute which is disposed in a parachute pack, wherein said pack includes at least one cover therefor having an opening therein and an elongated securing member extending through said opening to the exterior of said pack, and including an exposed loop and a pin assembly including a pin extending through said loop at the exterior of said pack to maintain said cover closed, the improvement in said pin assembly comprising:

an actuator including a housing and a piston and being associated directly with said pin, said pin being carried by and movable with said housing, said actuator being carried on the exterior of said pack immediately adjacent said loop and being adapted to withdraw said pin from said loop when said actuator is activated and a thrust plate carried by said piston adjacent the free end thereof, said thrust plate engaging said loop upon actuation of said actuator.

2. The invention as claimed in claim 1 wherein said actuator is of the type which is actuated by an electrical current.

3. The invention as claimed in claim 2 wherein said actuator is a pyrotechnic actuator.

4. The invention as claimed in claim 1 wherein said piston is normally substantially within said housing and is propelled outwardly therefrom upon actuation of said actuator.

5. The invention as claimed in claim 1 wherein substantially the entire support for said pin assembly and actuator is through the interfitting of said pin within said loop.

6. In an automatic activation system for initiating the deployment of a parachute which is disposed in a parachute pack, wherein said pack includes at least one cover therefor having an opening therein and an elongated securing member extending through said opening to the exterior of said pack, and including an exposed loop and a pin assembly including a pin extending through said loop at the exterior of said pack to maintain said cover closed, the improvement in said pin assembly comprising:

an actuator including a housing and a piston and being associated directly with said pin, said actuator being carried on the exterior of said pack immediately adjacent said loop and being adapted to withdraw said pin from said loop when said actuator is activated and further including a thrust plate carried by one of said housing and said piston adjacent the free end of the same and said pin being associated with the other of said housing and said piston, said thrust plate engaging said loop upon actuation of said actuator.

7. The invention as claimed in claim 6 wherein said actuator is a pyrotechnic actuator.

8. The invention as claimed in claim 6 wherein substantially the entire support for said pin assembly and actuator is through the interfitting of said pin within said loop.

9. The invention as claimed in claim 6 wherein said actuator is of the type which is actuated by an electrical current.

* * * * *